(12) United States Patent
Sohma

(10) Patent No.: US 7,664,738 B2
(45) Date of Patent: Feb. 16, 2010

(54) SEARCH SYSTEM, INFORMATION PROCESSING APPARATUS, CONTROL METHOD THEREFOR, AND PROGRAM

(75) Inventor: Hidemoto Sohma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 11/275,062

(22) Filed: Dec. 7, 2005

(65) Prior Publication Data

US 2006/0122986 A1  Jun. 8, 2006

(30) Foreign Application Priority Data

Dec. 7, 2004  (JP)  ............................. 2004-354703

(51) Int. Cl.
  *G06F 17/30*  (2006.01)
(52) U.S. Cl. .............................. 707/3; 707/10; 707/101; 707/102; 707/104.1; 709/201; 715/243
(58) Field of Classification Search ...................... 707/3, 707/10, 101, 102, 104.1; 709/201; 715/243
  See application file for complete search history.

(56) References Cited

U.S. PATENT DOCUMENTS

| | | | | |
|---|---|---|---|---|
| 6,681,227 | B1 * | 1/2004 | Kojima et al. | 707/10 |
| 7,051,048 | B2 | 5/2006 | Sohma et al. | 707/200 |
| 2001/0049826 | A1 * | 12/2001 | Wilf | 725/120 |
| 2002/0078180 | A1 * | 6/2002 | Miyazawa | 709/219 |
| 2002/0198869 | A1 * | 12/2002 | Barnett | 707/3 |
| 2003/0028889 | A1 * | 2/2003 | McCoskey et al. | 725/91 |
| 2004/0049558 | A1 * | 3/2004 | Lee et al. | 707/104.1 |
| 2004/0213458 | A1 * | 10/2004 | Kanatsu | 707/3 |
| 2006/0031216 | A1 * | 2/2006 | Semple et al. | 707/4 |

FOREIGN PATENT DOCUMENTS

| | | |
|---|---|---|
| JP | 2001-160068 A | 6/2001 |
| JP | 2001-195421 A | 7/2001 |

* cited by examiner

*Primary Examiner*—Hosain T Alam
*Assistant Examiner*—Jieying Tang
(74) *Attorney, Agent, or Firm*—Fitzpatrick, Cella, Harper & Scinto

(57) ABSTRACT

In a search system in which a plurality of first devices which store multimedia contents, a plurality of second devices which store attribute information on multimedia contents and have a search function of searching for the multimedia contents on the basis of the attribute information, and a third device which stores information on the respective second devices and selects, from the plurality of second devices, a device caused to execute search based on a search instruction received from the user terminal are connected to each other via a network, the third device receives a search instruction from the user terminal, and selects, from the plurality of second devices on the basis of the search instruction, a device caused to execute search based on the search instruction. The third device collects and integrates search results based on the search instruction, from the selected second device. The third device transmits the integrated search result to the user terminal.

6 Claims, 11 Drawing Sheets

FIG. 3

| | |
|---|---|
| `<IndexingTicket>` | 31 |
|   `<Document id=" Strage1/2003/0123456>` | 32 |
|     `<Metadata>` | 33 |
|       `<Title>` | 34 |
|         Economic Trend in Fiscal 2003 | 35 |
|       `</Title>` | 36 |
|       `<SectionName No=" 1" Page=" 1">` | 37 |
|         Overview | 38 |
|       `</SectionName>` | 39 |
|       `<Figure Type = "Graph" Page=" 2">` | 310 |
|         `<DominantColor>` | 311 |
|           0.0, 0.0, 0.2, 0.4, ··· | 312 |
|         `</DominantColor>` | 313 |
|         `<FigureTitle>` | 314 |
|           Economic Change in Fiscal 2003 | 315 |
|         `</FigureTitle>` | 316 |
|       `</Figure>` | 317 |
|       ... | 318 |
|     `</Metadata>` | 319 |
|   `</Document>` | 320 |
|   ... | 321 |
| `</IndexingTicket>` | 322 |

FIG. 5

| STORAGE SERVER NAME | SEARCH SERVER NAME | SEARCH FUNCTION OF SEARCH SERVER | CONTENT ID |
|---|---|---|---|
| STORAGE SERVER A | KEYWORD SEARCH SERVER | keyword<br>Title<br>(SEARCH FOR PARTIAL CHARACTER STRING OF KEYWORD OR TITLE) | 01234567 |
| STORAGE SERVER B | IMAGE SEARCH SERVER | DominantColor<br>(SEARCH BASED ON DOMINANT COLOR OF IMAGE AND POSITION OF THE COLOR) | 34343444 |
| | | | |

FIG. 8

| STORAGE SERVER NAME | SEARCH SERVER NAME | CONTENT ID |
|---|---|---|
| STORAGE SERVER A | KEYWORD SEARCH SERVER | 01234567 |
| STORAGE SERVER B | IMAGE SEARCH SERVER | 34343444 |
|  |  |  |

SEARCH SYSTEM, INFORMATION PROCESSING APPARATUS, CONTROL METHOD THEREFOR, AND PROGRAM

FIELD OF THE INVENTION

The present invention relates to a search system which searches for multimedia contents on the basis of a search instruction input from a user terminal, an information processing apparatus which forms the search system, a control method therefor, and a program.

BACKGROUND OF THE INVENTION

Recently, systems which use multimedia contents such as moving images, still images, sounds, and documents have been implemented along with the development of digital data processing/communication technologies. Among these systems, there is also proposed a system which can create and record various multimedia contents and uses multimedia contents containing various types of multimedia contents.

As multimedia contents are used more and more, the data size of each multimedia content increases with an increase in expressions such as the resolution of the multimedia content.

When different save formats appropriate for recording and use are selected for respective multimedia contents, various formats coexist. A device which utilizes such multimedia contents must be compatible with many formats, as needed.

As multimedia contents are exploited more and more, the user utilizes and accumulates many multimedia contents, and the search technique for multimedia contents becomes more important.

The search technique must deal with especially many formats of multimedia contents and a large data size. In addition, to cope with a large amount of multimedia contents, the search technique has changed from a technique of simply reading out internal information of each multimedia content and searching for the multimedia content.

As the search technique, it becomes popular to extract information necessary for search as metadata in advance from the contents of each multimedia content in accordance with each moving image, still image, sound, document, or the like contained in the multimedia content, accumulate the metadata, and utilize the metadata for search.

According to this method, if extracted/saved metadata have the same format, the metadata can be searched for regardless of the format of each multimedia content in search. As a characteristic feature of this method, a large amount of multimedia contents can be searched for at a high speed without reading and interpreting internal information of a large amount of multimedia contents at a large data size in search.

As the digital communication technique for a network and the like advances, the environment is ripe for a process which can be performed in cooperation with a plurality of devices. However, even with an increase in communication speed by the development of the communication technique, a long time is taken to transfer multimedia contents of a relatively large data size.

Even in this environment, transfer of multimedia contents puts a heavy load on the device and network. In general, even the above-mentioned system which saves and shares multimedia contents does not freely transfer multimedia contents.

This phenomenon becomes noticeable particularly when only a low-speed network environment can be used or the performance of a user's device is low. In many cases, devices which save and share multimedia contents independently exist and are distributed on the network.

The search technique itself can extract and save, with a common format and items, metadata necessary to search for a single media content such as a still image or sound as far as the metadata is simple such as a creation date and time or a title. However, most of items and formats which depend on media contents cannot be commonly used, and search techniques and usages of their metadata are greatly different from each other.

For example, for a moving or still image, the main color of an image information part of the content or the like can be extracted as a feature amount (quantity) and used as metadata. For sound, the frequency component of an audio information part can be extracted as a feature amount and used as metadata. These metadata have nothing in common, and search functions for these data are implemented in different ways.

For this reason, services for providing the search function and the like are often independently provided as search functions corresponding to respective media. These search functions are distributed on the network.

In the above-described environment, when multimedia contents are searched for, a search service capable of effectively searching them for a still image part and a search service capable of effectively searching them for a text part such as a document content or title are different. These search services are distributed on the network.

Owing to the convenience of the system or network, devices which can possess and share target multimedia contents may be limited depending on the search service. In this environment, the user must search for a search service which can search for desired multimedia contents.

Although standards such as WSDL (Web Services Description Language by the W3C) which targets search for a search service have been established, respective search services have different functions, as described above. Further, there is neither information on multimedia contents which can be searched for by the service, nor information on devices which save and share the multimedia contents. Thus, the above problems cannot be solved.

As a method for solving these problems, several techniques have been proposed.

For example, in Japanese Patent Laid-Open No. 2001-195421, search index information is kept accurate while storages/search engines are distributed. In order to accurately reflect in the search engine a change of content information in a dynamic storage, the update data is exchanged. However, in Japanese Patent Laid-Open No. 2001-195421, the relationship between search engines and their recognition must be given in advance.

In Japanese Patent Laid-Open No. 2001-160068, a search instruction used for search is recorded as a search target by adding metadata such as a comment. By allowing reuse of search instruction information, a search instruction can be easily input.

However, Japanese Patent Laid-Open Nos. 2001-195421 and 2001-160068 do not consider any configuration for using a search engine optimal for a search instruction from a plurality of types of search engines, and cannot execute efficient search.

SUMMARY OF THE INVENTION

The present invention has been made to overcome the conventional drawbacks, and has as its object to provide a search system which is formed from a plurality of types of search engines and can perform more preferable, efficient search, an information processing apparatus, a control method therefor, and a program.

According to the present invention, the foregoing object is attained by providing a search system which searches for multimedia contents on the basis of a search instruction input from a user terminal, comprising:

a plurality of first devices which store the multimedia contents;

a plurality of second devices which store attribute information on the multimedia contents and have a search function of searching for the multimedia contents on the basis of the attribute information;

a third device which stores information on the respective second devices and selects, from the plurality of second devices, a device caused to execute search based on the search instruction received from the user terminal; and a communication network which connects the user terminal and the first to third devices to each other, the third device comprising reception means for receiving a search instruction from the user terminal, selection means for selecting, from the plurality of second devices on the basis of the search instruction received by the reception means, a device caused to execute search based on the search instruction, integration means for collecting and integrating search results based on the search instruction, from the second device selected by the selection means, and transmission means for transmitting the search result integrated by the integration means to the user terminal.

In a preferred embodiment, the selection means inquires, of the respective second devices, whether search based on the search instruction received by the reception means is possible, and selects, from the plurality of second devices on the basis of response information to the inquiry, a device caused to execute search based on the search instruction.

In a preferred embodiment, the third device further comprises storage means for storing a management table which manages information representing first devices searchable by the respective second devices, and the selection means refers to the management table on the basis of a search instruction which is received by the reception means and contains the information representing the first devices, and selects, from the plurality of second devices, a device caused to execute search based on the search instruction.

In a preferred embodiment, the third device further comprises storage means for storing a management table in which information representing first devices searchable by the respective second devices, and identification information representing multimedia contents stored in the first devices are managed in correspondence with each other, and the selection means refers to the management table on the basis of a search instruction which is received by the reception means and contains the information representing the first devices, and selects, from the plurality of second devices, a device caused to execute search based on the search instruction.

In a preferred embodiment, the third device further comprises storage means for storing a management table which manages information representing search functions of the respective second devices, and the selection means refers to the management table, and selects, from the plurality of second devices, a device having a search function specified by the search instruction received by the reception means.

In a preferred embodiment, the third device further comprises storage means for storing a management table in which information representing search functions of the respective second devices, and information representing first devices searchable by the respective second devices are managed in correspondence with each other, and the selection means refers to the management table on the basis of a search instruction which is received by the reception means and contains the information representing the first devices, and selects, from the plurality of second devices, a device caused to execute search based on the search instruction.

In a preferred embodiment, the third device further comprises storage means for storing a management table in which information representing search functions of the respective second devices, and identification information representing multimedia contents stored in first devices searchable by the respective second devices are managed in correspondence with each other, and the selection means refers to the management table on the basis of a search instruction which is received by the reception means and contains the information representing the first devices, and selects, from the plurality of second devices, a device caused to execute search based on the search instruction.

According to the present invention, the foregoing object is attained by providing an information processing apparatus which is connected via a communication network to a user terminal, a plurality of first devices that store multimedia contents, and a plurality of second devices that store attribute information on the multimedia contents and have a search function of searching for the multimedia contents on the basis of the attribute information, comprising:

reception means for receiving a search instruction from the user terminal;

selection means for selecting, from the plurality of second devices on the basis of the search instruction received by the reception means, a device caused to execute search based on the search instruction;

integration means for collecting and integrating search results based on the search instruction, from the second device selected by the selection means; and transmission means for transmitting the search result integrated by the integration means to the user terminal.

According to the present invention, the foregoing object is attained by providing a method of controlling an information processing apparatus which is connected via a communication network to a user terminal, a plurality of first devices that store multimedia contents, and a plurality of second devices that store attribute information on the multimedia contents and have a search function of searching for the multimedia contents on the basis of the attribute information, comprising:

a reception step of receiving a search instruction from the user terminal;

a selection step of selecting, from the plurality of second devices on the basis of the search instruction received in the reception step, a device caused to execute search based on the search instruction;

an integration step of collecting and integrating search results from the second device selected in the selection step; and a transmission step of transmitting the search result integrated in the integration step to the user terminal.

According to the present invention, the foregoing object is attained by providing a program for implementing control of an information processing apparatus which is connected via a communication network to a user terminal, a plurality of first devices that store multimedia contents, and a plurality of second devices that store attribute information on the multimedia contents and have a search function of searching for the multimedia contents on the basis of the attribute information, comprising:

a program code for a reception step of receiving a search instruction from the user terminal;

a program code for a selection step of selecting, from the plurality of second devices on the basis of the search instruction received in the reception step, a device caused to execute search based on the search instruction;

a program code for an integration step of collecting and integrating search results from the second device selected in the selection step; and a program code for a transmission step of transmitting the search result integrated in the integration step to the user terminal.

According to the present invention, the foregoing object is attained by providing a search system which searches for multimedia contents on the basis of a search instruction input from a user terminal, comprising:

a plurality of first devices which store the multimedia contents;

a plurality of second devices which store attribute information on the multimedia contents and have a search function of searching for the multimedia contents on the basis of the attribute information;

a third device which stores information on the respective first devices, and searches the plurality of second devices for a device caused to execute search based on the search instruction received from the user terminal; and a communication network which connects the user terminal and the first to third devices to each other, the third device comprising reception means for receiving, from the user terminal, first device information representing a first device which stores a multimedia content to be searched for, search means for searching, on the basis of the first device information received by the reception means, the plurality of second devices for a device caused to search the first device represented by the first device information, and transmission means for transmitting, to the user terminal, second device information representing the second device searched for by the search means.

In a preferred embodiment, the third device further comprises storage means for storing a management table which manages second device information representing second devices capable of searching for multimedia contents stored in the respective first devices, and the search means refers to the management table on the basis of the first device information received by the reception means, and searches the plurality of second devices for a device caused to search the first device represented by the first device information.

In a preferred embodiment, the third device further comprises storage means for storing a management table which manages, in correspondence with each other, second device information representing second devices capable of searching for multimedia contents stored in the respective first devices, and identification information representing the multimedia contents stored in the first devices, the search means refers to the management table on the basis of the first device information received by the reception means, searches the plurality of second devices for a device caused to search the first device represented by the first device information, and searches for identification information of a multimedia content corresponding to the searched second device, and the transmission means transmits, to the user terminal, second device information representing the second device searched for by the search means, and the identification information.

In a preferred embodiment, the third device further comprises storage means for storing a management table in which second device information representing second devices capable of searching for multimedia contents stored in the respective first devices, and information representing search functions of the second devices are managed in correspondence with each other, and the search means refers to the management table on the basis of the first device information received by the reception means, and searches the plurality of second devices for a device caused to search the first device represented by the first device information.

In a preferred embodiment, the third device further comprises storage means for storing a management table in which second device information representing second devices capable of searching for multimedia contents stored in the respective first devices, information representing search functions of the second devices, and identification information representing the multimedia contents stored in the respective first devices are managed in correspondence with each other, the search means refers to the management table on the basis of the first device information received by the reception means, searches the plurality of second devices for a device caused to search the first device represented by the first device information, and searches for identification information of a multimedia content corresponding to the searched second device, and the transmission means transmits, to the user terminal, second device information representing the second device searched for by the search means, and the identification information.

According to the present invention the foregoing object is attained by providing an information processing apparatus which is connected via a communication network to a user terminal, a plurality of first devices that store multimedia contents, and a plurality of second devices that store attribute information on the multimedia contents and have a search function of searching for the multimedia contents on the basis of the attribute information, comprising:

reception means for receiving, from the user terminal, first device information representing a first device which stores a multimedia content to be searched for;

search means for searching, on the basis of the first device information received by the reception means, the plurality of second devices for a device caused to search the first device represented by the first device information; and transmission means for transmitting, to the user terminal, second device information representing the second device searched for by the search means.

According to the present invention the foregoing object is attained by providing a method of controlling an information processing apparatus which is connected via a communication network to a user terminal, a plurality of first devices that store multimedia contents, and a plurality of second devices that store attribute information on the multimedia contents and have a search function of searching for the multimedia contents on the basis of the attribute information, comprising:

a reception step of receiving, from the user terminal, first device information representing a first device which stores a multimedia content to be searched for;

a search step of searching, on the basis of the first device information received in the reception step, the plurality of second devices for a device caused to search the first device represented by the first device information; and a transmission step of transmitting, to the user terminal, second device information representing the second device searched for in the search step.

According to the present invention the foregoing object is attained by providing a program for implementing control of an information processing apparatus which is connected via a communication network to a user terminal, a plurality of first devices that store multimedia contents, and a plurality of second devices that store attribute information on the multimedia contents and have a search function of searching for the multimedia contents on the basis of the attribute information, comprising:

a program code for a reception step of receiving, from the user terminal, first device information representing a first device which stores a multimedia content to be searched for;

a program code for a search step of searching, on the basis of the first device information received in the reception step, the plurality of second devices for a device caused to search the first device represented by the first device information; and a program code for a transmission step of transmitting, to the user terminal, second device information representing the second device searched for in the search step.

According to the present invention the foregoing object is attained by providing a search system which searches for multimedia contents on the basis of a search instruction input from a user terminal, comprising:

a plurality of first devices which store the multimedia contents;

a plurality of second devices which store attribute information on the multimedia contents and have a search function of searching for the multimedia contents on the basis of the attribute information; and a communication network which connects the user terminal and the first and second devices to each other, at least one of the second devices comprising reception means for receiving a search instruction from the user terminal, selection means for selecting, from the plurality of second devices including the at least one second device on the basis of the search instruction received by the reception means, a device for executing search based on the search instruction, integration means for collecting and integrating search results based on the search instruction, from the second device selected by the selection means, and transmission means for transmitting the search result integrated by the integration means to the user terminal.

In a preferred embodiment, the second device further comprises storage means for storing a management table which manages information representing first devices that store multimedia contents searchable by the respective second devices including the at least one second device, and synchronization means for synchronizing contents of management tables stored in the respective second devices, and the selection means refers to the management table on the basis of the search instruction received by the reception means, and selects, from the plurality of second devices including the at least one second device, a device for executing search based on the search instruction.

In a preferred embodiment, the second device further comprises storage means for storing a management table in which information representing the respective second devices including the at least one second device, and information representing first devices that store multimedia contents searchable by the respective second devices are managed in correspondence with each other, and synchronization means for synchronizing contents of management tables stored in the respective second devices, and the selection means refers to the management table on the basis of the search instruction received by the reception means, and selects, from the plurality of second devices including the at least one second device, a device for executing search based on the search instruction.

In a preferred embodiment, the second device further comprises storage means for storing a management table in which information representing the respective second devices including the at least one second device, information representing search functions of the plurality of second devices, and information representing first devices that store multimedia contents searchable by the respective second devices are managed in correspondence with each other, and synchronization means for synchronizing contents of management tables stored in the respective second devices, and the selection means refers to the management table on the basis of the search instruction received by the reception means, and selects, from the plurality of second devices including the at least one second device, a device for executing search based on the search instruction.

According to the present invention, the foregoing object is attained by providing an information processing apparatus which is connected via a communication network to a user terminal, a plurality of first devices that store multimedia contents, and a plurality of second devices that store attribute information on the multimedia contents and have a search function of searching for the multimedia contents on the basis of the attribute information, and is configured as one of the plurality of second devices, comprising:

reception means for receiving a search instruction from the user terminal;

selection means for selecting, from the plurality of second devices including the second device serving as the information processing apparatus on the basis of the search instruction received by the reception means, a device for executing search based on the search instruction;

integration means for collecting and integrating search results based on the search instruction, from the second device selected by the selection means; and transmission means for transmitting the search result integrated by the integration means to the user terminal.

According to the present invention, the foregoing object is attained by providing a method of controlling an information processing apparatus which is connected via a communication network to a user terminal, a plurality of first devices that store multimedia contents, and a plurality of second devices that store attribute information on the multimedia contents and have a search function of searching for the multimedia contents on the basis of the attribute information, and is configured as one of the plurality of second devices, comprising:

a reception step of receiving a search instruction from the user terminal;

a selection step of selecting, from the plurality of second devices including the second device serving as the information processing apparatus on the basis of the search instruction received in the reception step, a device for executing search based on the search instruction;

an integration step of collecting and integrating search results based on the search instruction, from the second device selected in the selection step; and a transmission step of transmitting the search result integrated in the integration step to the user terminal.

According to the present invention, the foregoing object is attained by providing a program for implementing control of an information processing apparatus which is connected via a communication network to a user terminal, a plurality of first devices that store multimedia contents, and a plurality of second devices that store attribute information on the multimedia contents and have a search function of searching for the multimedia contents on the basis of the attribute information, and is configured as one of the plurality of second devices, comprising:

a program code for a reception step of receiving a search instruction from the user terminal;

a program code for a selection step of selecting, from the plurality of second devices including the second device serving as the information processing apparatus on the basis of the search instruction received in the reception step, a device for executing search based on the search instruction;

a program code for an integration step of collecting and integrating search results based on the search instruction, from the second device selected in the selection step; and a program code for a transmission step of transmitting the search result integrated in the integration step to the user terminal.

According to the present invention, the foregoing object is attained by providing a search system which searches for multimedia contents on the basis of a search instruction input from a user terminal, comprising:

a plurality of first devices which store the multimedia contents;

a plurality of second devices which store attribute information on the multimedia contents and have a search function of searching for the multimedia contents on the basis of the attribute information; and a communication network which connects the user terminal and the first and second devices to each other, at least one of the first devices comprising reception means for receiving a search request instruction from the user terminal, selection means for selecting, from the plurality of second devices on the basis of the search request instruction received by the reception means, a device capable of executing search based on the search request instruction, and transmission means for transmitting second device information representing the second device selected by the selection means to the user terminal.

In a preferred embodiment, the first device further comprises storage means for storing a management table which manages information representing second devices capable of searching for a multimedia content stored in the first device, and the selection means refers to the management table on the basis of the search request instruction received by the reception means, and selects, from the plurality of second devices, a device capable of searching the first device.

In a preferred embodiment, the first device further comprises storage means for storing a management table in which information representing second devices capable of searching for a multimedia content stored in the first device, and information representing search functions of the second devices are managed in correspondence with each other, and the selection means refers to the management table on the basis of the search request instruction received by the reception means, and selects, from the plurality of second devices, a device capable of searching the first device.

In a preferred embodiment, the first device further comprises storage means for storing a management table in which information representing the second devices which store attribute information on a multimedia content stored in the first device, and information representing search functions of the second devices are managed in correspondence with each other, and the selection means refers to the management table on the basis of the search request instruction received by the reception means, and selects, from the plurality of second devices, a device capable of searching the first device.

According to the present invention, the foregoing object is attained by providing an information processing apparatus which is connected via a communication network to a user terminal, a plurality of first devices that store multimedia contents, and a plurality of second devices that store attribute information on the multimedia contents and have a search function of searching for the multimedia contents on the basis of the attribute information, and is configured as one of the plurality of first devices, comprising:

reception means for receiving a search request instruction from the user terminal;

selection means for selecting, from the plurality of second devices on the basis of the search request instruction received by the reception means, a device capable of executing search based on the search request instruction; and transmission means for transmitting second device information representing the second device selected by the selection means to the user terminal.

According to the present invention, the foregoing object is attained by providing a method of controlling an information processing apparatus which is connected via a communication network to a user terminal, a plurality of first devices that store multimedia contents, and a plurality of second devices that store attribute information on the multimedia contents and have a search function of searching for the multimedia contents on the basis of the attribute information, and is configured as one of the plurality of first devices, comprising:

a reception step of receiving a search request instruction from the user terminal;

a selection step of selecting, from the plurality of second devices on the basis of the search request instruction received in the reception step, a device capable of executing search based on the search request instruction; and a transmission step of transmitting second device information representing the second device selected in the selection step to the user terminal.

According to the present invention, the foregoing object is attained by providing a program for implementing control of an information processing apparatus which is connected via a communication network to a user terminal, a plurality of first devices that store multimedia contents, and a plurality of second devices that store attribute information on the multimedia contents and have a search function of searching for the multimedia contents on the basis of the attribute information, and is configured as one of the plurality of first devices, comprising:

a program code for a reception step of receiving a search request instruction from the user terminal;

a program code for a selection step of selecting, from the plurality of second devices on the basis of the search request instruction received in the reception step, a device capable of executing search based on the search request instruction; and a program code for a transmission step of transmitting second device information representing the second device selected in the selection step to the user terminal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a view showing an example of the description of metadata extracted from a multimedia content according to the first embodiment of the present invention;

FIG. 5 is a table showing an example of a server information management table according to the first embodiment of the present invention;

FIG. 8 is a table showing an example of a server information management table according to the third embodiment of the present invention;

DETAILED DESCRIPTION OF THE PREFERRED EMBODIMENTS

Preferred embodiments of the present invention will be described in detail in accordance with the accompanying drawings.

A search system according to the present invention assumes that functions of, e.g., saving and searching for multimedia contents distributedly exist in a plurality of devices in a search system which saves and searches for moving images, still images, sounds, documents, or multimedia contents containing these data. The search system according to the present invention also assumes that these devices cooperate with each other by using communication between them via a network. The search system according to the present invention can easily identify and search for multimedia contents by using various metadata extracted from respective multimedia contents. The search system implements simple, efficient use and application of multimedia contents.

First Embodiment

Figure 1:
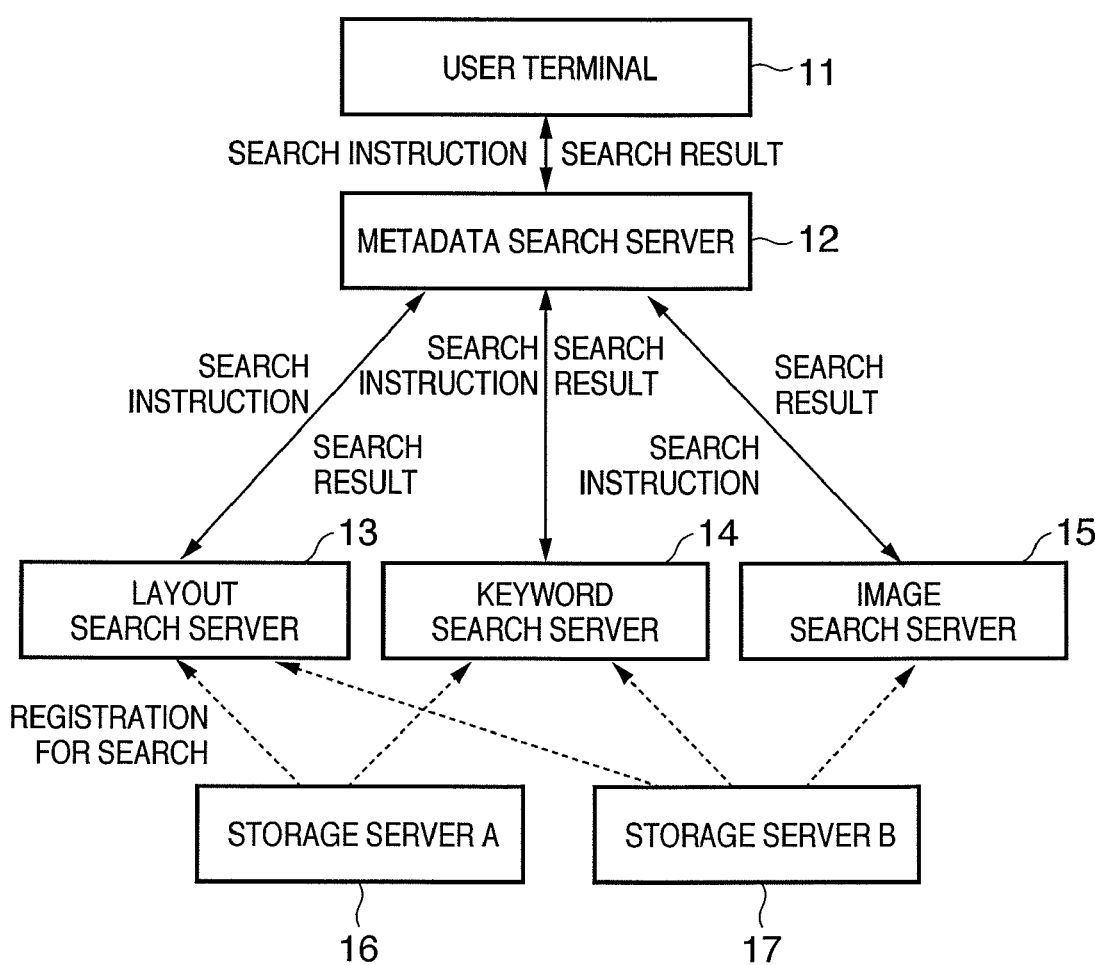
FIG. 1 is a block diagram showing the configuration of a search system according to the first embodiment of the present invention.

FIG. 1 is a block diagram showing the configuration of a search system according to the first embodiment of the present invention.

In the search system of FIG. 1, devices and servers are connected to each other via a network.

Reference numeral 11 denotes a user terminal which is used by the user, receives a search instruction from the user, and presents the search result to the user. The user terminal 11 assumes an information processing apparatus (e.g., a personal computer or portable terminal), or an input/output device (e.g., a moving/still image camera or printer).

The user terminal 11 is arbitrary as far as it is a device having a user interface including an input device (e.g., a mouse or keyboard) and an output device (e.g., a display).

Reference numerals 12 to 15 denote various search servers each of which may be formed from an information processing apparatus similar to the user terminal 11. Each search server is arbitrary as far as it is an information processing apparatus having a storage medium of a storage capacity to a certain degree. Further, search services (search functions) serving as functions implemented by various search servers may be arranged in the user terminal 11 or storage servers 16 and 17.

The metadata search server 12 is a server or service which supports implementation of a multimedia content search function on the basis of metadata (attribute information) assigned to multimedia contents.

The metadata search server 12 transmits a search instruction (query of search) received from the user terminal 11 to each search server, and causes the search server to select information from the query which can be searched by the search server. The metadata search server 12 collects pieces of selected information, and chooses a search server suitable for executing search under the query. The metadata search server 12 collects and integrates search results from the chosen search server, and outputs the integrated search result to the user terminal 11.

The layout search server 13 is a server or service which searches for a multimedia content on the basis of the layout of the multimedia content.

More specifically, the layout search server 13 calculates the degree of similarity with a multimedia content to be compared, on the basis of the positions (layout) of various objects (e.g., image data and text data in the multimedia content) which form the multimedia content. The layout search server 13 searches for a multimedia content having a high degree of similarity among calculated degrees of similarity.

The keyword search server 14 is a server or service which searches for a multimedia content on the basis of text information such as a keyword or the title of the multimedia content.

The image search server 15 is a server or service which searches for a multimedia content on the basis of image information of a still image or moving image in the multimedia content, e.g., information on the layout of dominant colors in the image information.

The search servers 12 to 15 are merely a preferable example. In addition to the search servers 12 to 15, the first embodiment assumes search functions which use various types of information such as the photographing composition and object of even the same image, the direction and position of a photographing object, the photographing time, the information processing apparatus, and various types of character string information in a document. In this case, a search server having a necessary search function can be further constructed in accordance with the application purpose. Also in this case, the present invention functions effectively.

The storage servers or servers 16 and 17 store multimedia contents themselves. Each of the storage servers 16 and 17 possesses a storage device of a relatively large capacity for storing multimedia contents.

The storage servers 16 and 17 may be arranged in the user terminal 11.

When the system which implements the present invention is configured by a large-scale system, the storage server is a server computer having a large-capacity auxiliary storage device. Many search servers and content management server are also server computers. With this configuration, the present invention assumes a system configuration which saves an enormous amount of multimedia contents and executes advanced search for them by computation of the server computer.

To the contrary, when the system which implements the present invention is configured by a small-scale system, a camera device which stores moving and still images is equipped with a storage medium for storing moving and still images. The present invention assumes a system configuration in which a user terminal for the user, a search server, and a storage service using the storage medium are mounted in the device.

A form in which these configurations coexist is also conceivable. A system which exploits a ubiquitous search environment by selectively using servers and services in the two systems is also available. The present invention can be applied to any form.

The hardware configurations of various terminals which form the search system according to the first embodiment will be explained with reference to FIG. 2.

Figure 2:
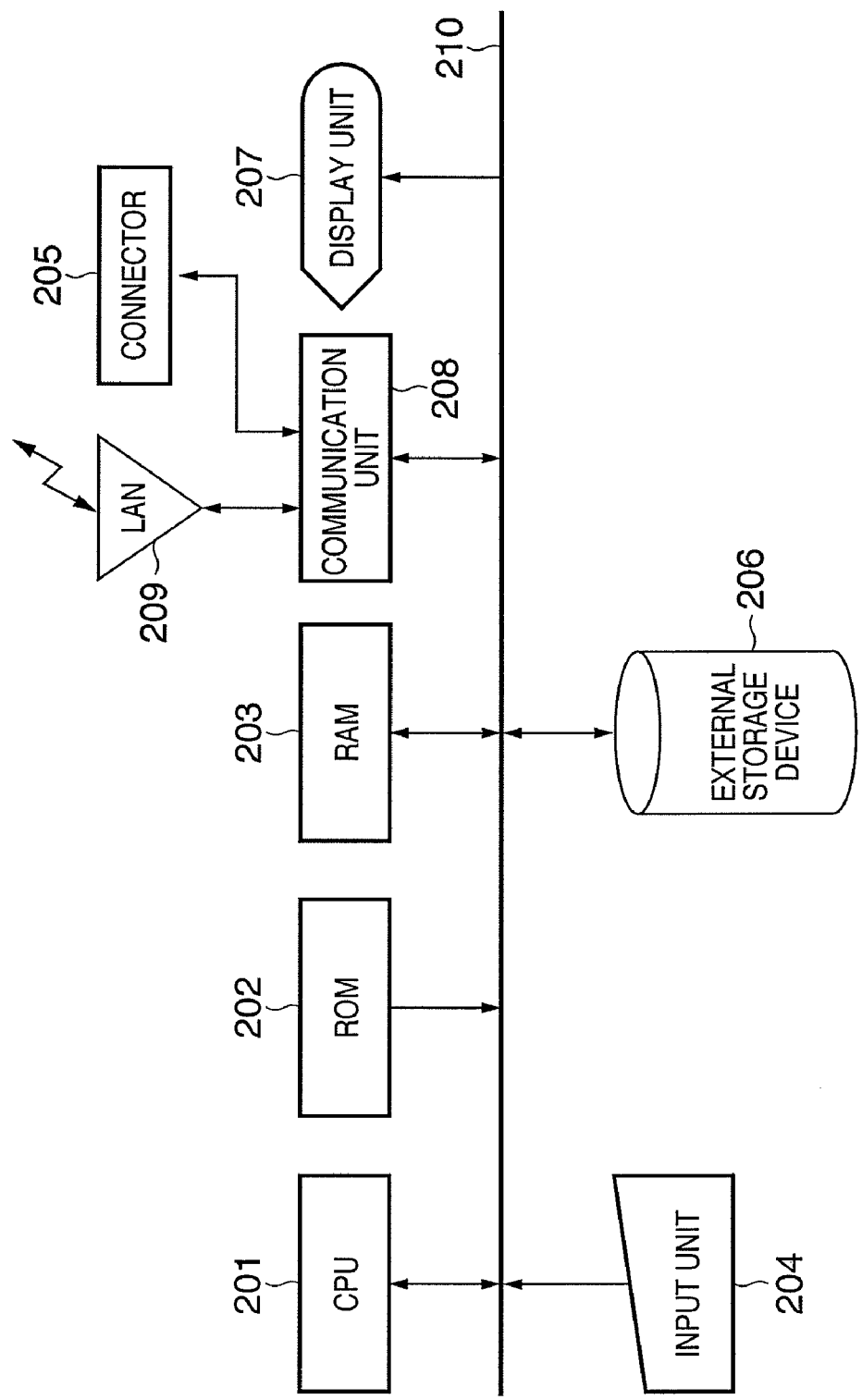
FIG. 2 is a block diagram showing the hardware configurations of various terminals which form the search system according to the first embodiment of the present invention.

FIG. 2 is a block diagram showing the hardware configurations of various terminals which form the search system according to the first embodiment of the present invention.

In FIG. 2, reference numeral 201 denotes a CPU which executes various control operations in various terminals of search systems in the first embodiment and the second to fifth embodiments to be described later. Reference numeral 202 denotes a ROM which stores a boot program executed in booting the terminal, and various control programs and various data for implementing the search systems in the first embodiment and the second to fifth embodiments to be described later. Reference numeral 203 denotes a RAM which stores a control program to be processed by the CPU 201 and provides a work area used when the CPU 201 executes various control operations.

Reference numeral 204 denotes an input unit which is made up of a keyboard, mouse, stylus pen, dial, and the like and provides various input operation environments for the user. Reference numeral 206 denotes an external storage device which is made up of a storage medium (e.g., a hard disk, flexible disk, optical disk, magnetic disk, magnetooptical disk, magnetic tape, or nonvolatile memory card) and a drive for driving the storage medium and storing various types of information.

A terminal which implements a storage server or service saves a large amount of multimedia contents, and comprises the external storage device 206 relatively large in capacity. A terminal which implements a search server or service stores, e.g., search metadata.

Reference numeral 207 denotes a display unit which is formed from a display (CRT or LCD) or the like and displays, to the user, the states of various input operations and various GUIs for implementing the search system.

Reference numeral 208 denotes a communication unit which is used to communicate with another information processing apparatus. The communication unit 208 has various communication functions for wired communication including RS232C, USB, IEEE1394, IEEE1284, SCSI, modem, and Ethernet and wireless communication including Bluetooth®, infrared communication, and IEEE802.11b.

Reference numeral 209 denotes a LAN which is used to communicate with an external device (information processing apparatus) such as a photographing device via the communication unit 208. Reference numeral 205 denotes a connector which is used to connect an external device such as a photographing device via the communication unit 208. An external storage device or image input device (scanner or digital camera) can be connected to the end of the connector 205.

In addition to the above examples, the LAN 209 may be any of the Internet, WAN, telephone line, dedicated digital circuit, ATM (Asynchronous Transfer Mode), frame relay line, communication satellite channel, cable television line, data broadcasting radio channel, and the like. The LAN 209 may be a so-called communication network which is implemented by a combination of them. The LAN 209 can take any form as far as data can be exchanged.

An example of the description of metadata extracted from a multimedia content according to the first embodiment will be explained with reference to FIG. 3.

FIG. 3 is a view showing an example of the description of metadata extracted from a multimedia content according to the first embodiment of the present invention.

In the first embodiment, various feature amounts are extracted in advance from multimedia contents in order to search for multimedia contents saved in the storage servers 16 and 17. These feature amounts must be registered as metadata in the metadata search server 12.

By registering the metadata, various search servers can search for multimedia contents regardless of various formats of various multimedia contents. In search, only search for metadata can be executed to shorten the search time.

Reference numerals 31 to 322 denote descriptions of metadata which is extracted from a given multimedia content, registered, and described in the XML (eXtensible Markup Language).

The description 31 represents the start of metadata, and the description 322 represents the end of the metadata. The description 32 holds identification information of the multimedia content. Metadata of the multimedia content identified by the identification information is described from the descriptions 32 to 320.

The description 321 represents metadata of a multimedia content other than the target multimedia content. The descriptions 33 to 319 represent metadata of the target multimedia content.

The descriptions 34 to 36 represent the title of the multimedia content. In this example, the descriptions 34 to 36 show that "Economic Trend in Fiscal 2003" is described as the title (text data). A search server (e.g., the keyword search server 14) which can effectively search for the metadata reads this description. The search server stores the read description together with identification information of the multimedia content, and provides a search function.

Similarly, the descriptions 37 to 39 represent the section of document data which forms the multimedia content. In this example, the descriptions 37 to 39 show that a section named "Overview" is described on a page of page number "1" with section number "1".

The descriptions 310 to 317 represent figure data which forms the multimedia content. In this example, the descriptions 310 to 317 show that a graph is pasted on a page of page number "2", and a numeral string serving as dominant color information, and a graph title "Economic Change in Fiscal 2003" are added. A search server (e.g., the image search server 15) which can effectively search for the metadata similarly stores these metadata, and provides a search function.

A metadata registration process when the metadata search server 12 according to the first embodiment registers metadata in various search servers will be explained with reference to FIG. 4.

Figure 4:
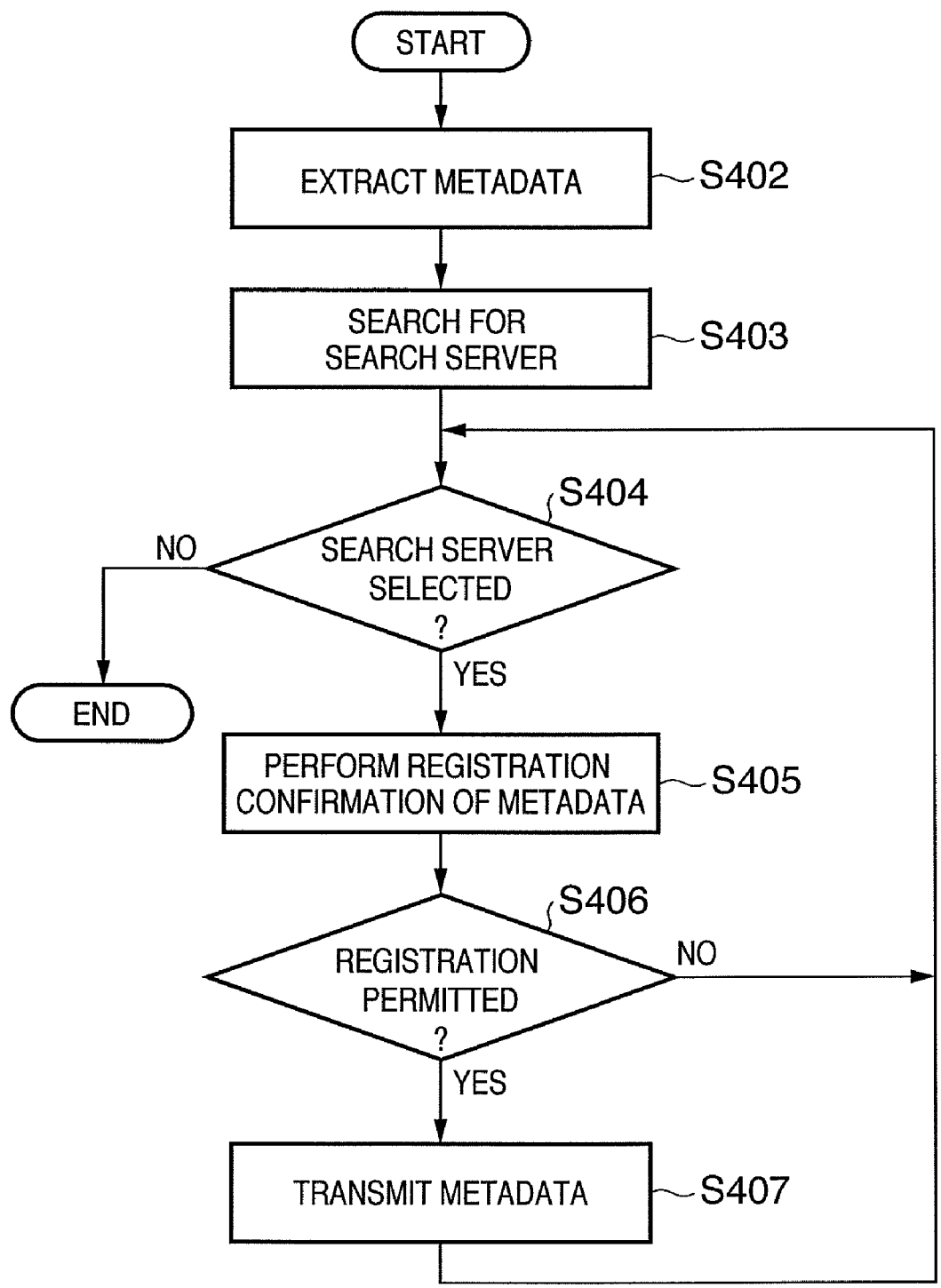
FIG. 4 is a flowchart showing a metadata registration process according to the first embodiment of the present invention.

FIG. 4 is a flowchart showing a metadata registration process according to the first embodiment of the present invention.

When a multimedia content is to be registered in the search server, the metadata search server 12 extracts metadata from the multimedia content to be processed in step S402. In step S403, the metadata search server 12 presents the extracted metadata to the search servers 12 to 15 to search for a registrable search server.

In step S404, the metadata search server 12 determines whether a registrable search server has been selected. If no registrable search server has been selected (NO in step S404), the process ends. Also if no registrable search server is searched for in step S404, the process ends.

If a registrable search server has been selected (YES in step S404), the process advances to step S405.

In step S405, the metadata search server 12 performs registration confirmation of the metadata in the selected search server. Even when the registration confirmation is performed, the search server as the registration destination cannot always register metadata. This is because the search server as the registration destination verifies once the contents of metadata to be registered, and may reject registration of the metadata depending on the verification result.

Thus, in step S406, the metadata search server 12 determines whether the selected search server permits registration. If the selected search server rejects registration (NO in step S406), the process returns to step S404. If the selected search server permits registration (YES in step S406), the process advances to step S407 to transmit the metadata to the selected search server. Then, the selected search server registers the metadata.

The metadata search server 12 registers, in its external storage device 206, server information on each search server to which the metadata has been transmitted. The server information is obtained by the metadata registration process in FIG. 4.

At this time, the metadata search server 12 stores server information as shown in FIG. 5 in a server information management table in the external storage device 206 of the metadata search server 12. The server information shown in FIG. 5 especially manages the correspondence between a search server, a storage server, and a multimedia content of the storage server that is registered for search in the search server.

More specifically, server information stored in the server information management table manages the correspondence between each search server name, its search function, a content ID for specifying a multimedia content which can be searched for by the search server, and the name of a storage server which stores the multimedia content.

A search process when a multimedia content is searched for on the basis of a search instruction from the user terminal 11 will be explained with reference to FIG. 6.

Figure 6:
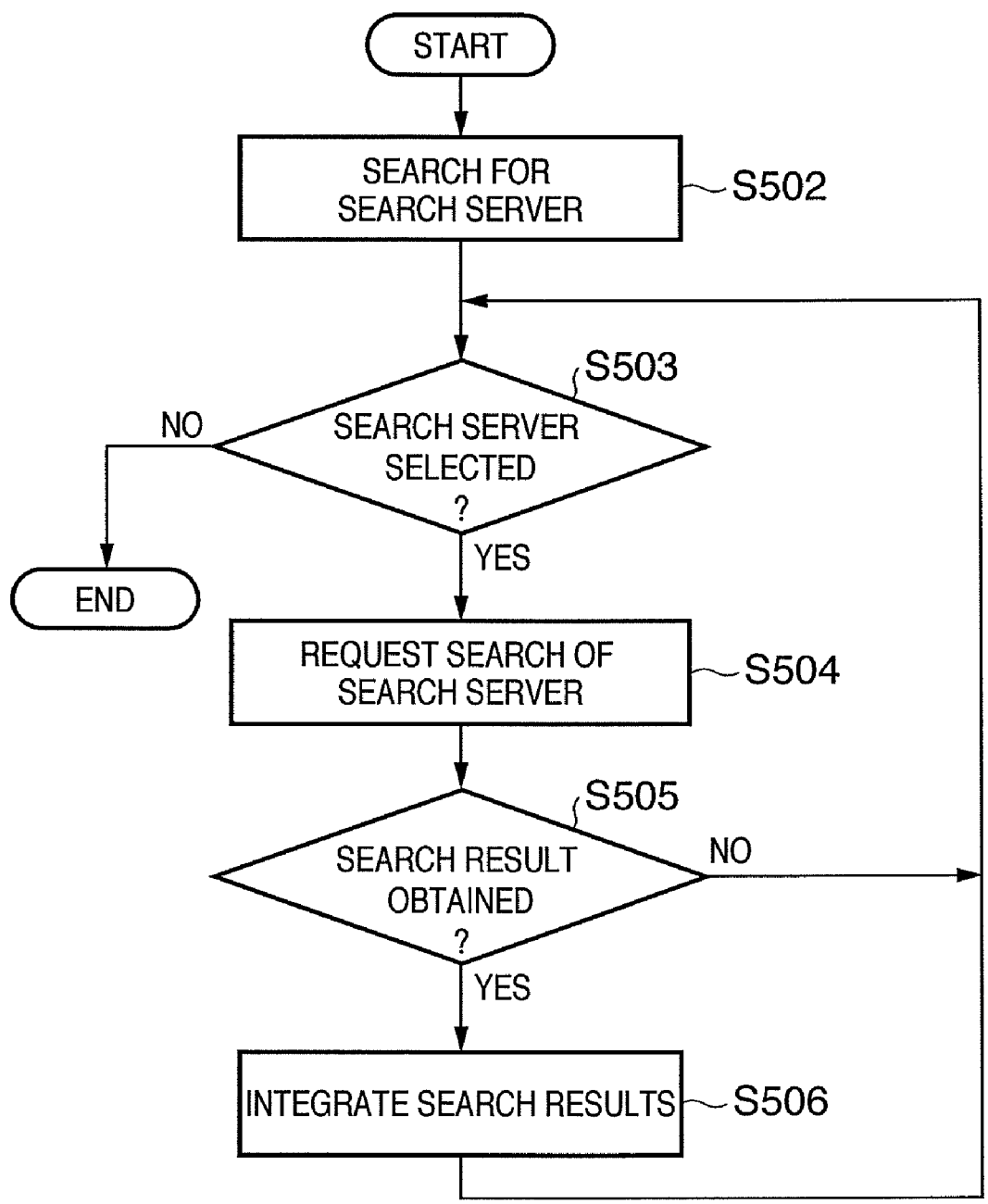
FIG. 6 is a flowchart showing a search process according to the first embodiment of the present invention.

FIG. 6 is a flowchart showing a search process according to the first embodiment of the present invention.

The metadata search server 12 receives a search instruction (query of search) from the user terminal 11, and executes a process of searching for a multimedia content corresponding to the search instruction. In step S502, the metadata search server 12 refers to the server information management table in FIG. 5, and chooses a search server suitable for the query.

When a server information management table as shown in FIG. 5 is created, a plurality of tables associated with a plurality of search servers can be obtained in an environment where various types of search servers exist. Further, a proper search server which implements search limited to a storage server desired by the user can be chosen.

Note that creation of the server information management table is not indispensable. For example, whether search under a query received from the user terminal is possible is inquired of each search server. Based on response information to the inquiry, a search server suitable for the query may be chosen.

In step S503, the metadata search server 12 determines the presence/absence of the selected search server. If no selected search server exists (NO in step S503), the process ends. If the selected search server exists (YES in step S503), the process advances to step S504.

When a plurality of selected search servers exist, one of them is selected and the process from step S504 is executed.

In step S504, the metadata search server 12 requests the selected search server to perform search under the received query.

Search request information transmitted by the search request may be the query itself, or metadata which is generated from the query.

In step S505, the metadata search server 12 determines the presence/absence of the search result from the requested search server. If no search result is received (NO in step S505), the process returns to step S503. If the search result is received (YES in step S505), the process advances to step S506.

Determination in step S505 is done because the selected search server does not always search for a proper multimedia content as a search result. That is, the search server selected in step S503 is only a search server which can execute search under the query. Each search server examines the contents of search information, and searches for a multimedia content proper for a final search result.

Every time a search result is obtained in step S505, the metadata search server 12 cumulatively holds search results in step S506. When the metadata search server 12 obtains search results from selected search servers, it integrates the held search results and outputs the final search result to the user terminal 11.

As a search result output method, for example, overlapping search results are combined into one, the priority is set in accordance with the overlapping count, and search results are sorted by the priority. A search result having the highest priority can be output as a final search result, or a predetermined number of search results (e.g., upper three search results) can be output.

In addition to this, pieces of content information (search log (search count and search user), registration date, creator, and the like) of each multimedia content may be combined to determine and output a final search result. In this manner, any method can be adopted as far as a search result intended by the user can be output.

The search instruction (query of search) can be a text-based instruction (text such as a keyword in a multimedia content), an image feature amount-based instruction (color feature amount), or a combination of them. In addition to them, designation of, e.g., a search server used for search or a storage server for storing a multimedia content to be searched for can be used as a query. Various factors such as the search precision and ability of the search server, and the type of information processing apparatus which forms a search system can be used as queries. Moreover, identification information representing a multimedia content to be searched for can also be used as a query.

For example, the user terminal 11 can receive, as query, a text and information on a storage server which stores a multimedia content to be searched for. The metadata search server 12 can search for an appropriate search server on the basis of the queries received from the user terminal 11 and the server information management table. In this example, a search server which has a text search function and can search for a storage designated by the query is selected.

In the above-described first embodiment and the second to fifth embodiments to be described later, when search is executed by a plurality of search servers, each search server preferably searches for a specific part of the server-searchable query in terms of the search efficiency. However, the present invention is not limited to this.

As described above, according to the first embodiment, the metadata search server 12 selects, on the basis of the query received from the user terminal 11, a search server optimal fpr performing search under the query. The metadata search server 12 collects search results from the selected search server, and outputs them to the user terminal 11.

The user of the user terminal 11 can more efficiently search for a desired multimedia content at high convenience without any consciousness of the type of search server which forms the search system, or the contents and type of a multimedia content stored in the storage server.

Second Embodiment

In the first embodiment, each search server name, its search function, a content ID for identifying a multimedia content which can be searched for by the search server, and the name of a storage server which stores the multimedia content are made to correspond to each other, and stored as server information in the server information management table. In addition to this configuration, for example, metadata extracted from each multimedia content may be saved in correspondence with the search instruction.

On the basis of metadata obtained from a query received from a user terminal 11, a metadata search server 12 can choose a search server which corresponds to metadata associated with the obtained metadata. In other words, the metadata search server 12 can choose a search server which has a search function specified by metadata.

As described above, according to the second embodiment, a search server having a search function specified by a query can be preferably chosen, in addition to the effects described in the first embodiment.

Third Embodiment

In the first and second embodiments, the metadata search server 12 chooses, on the basis of a query received from the user terminal 11, a search server suitable for search under the query. The metadata search server 12 causes the chosen search server to execute search, and outputs the search result to the user terminal 11.

To the contrary, the third embodiment constructs a content management server for managing, as server information, information by which the type of multimedia content stored in each storage server and a search server proper for searching each storage server for a multimedia content are made to correspond with each other. The third embodiment will describe a search system using the content management server.

The configuration of the search system according to the third embodiment will be explained with reference to FIG. 7.

Figure 7:
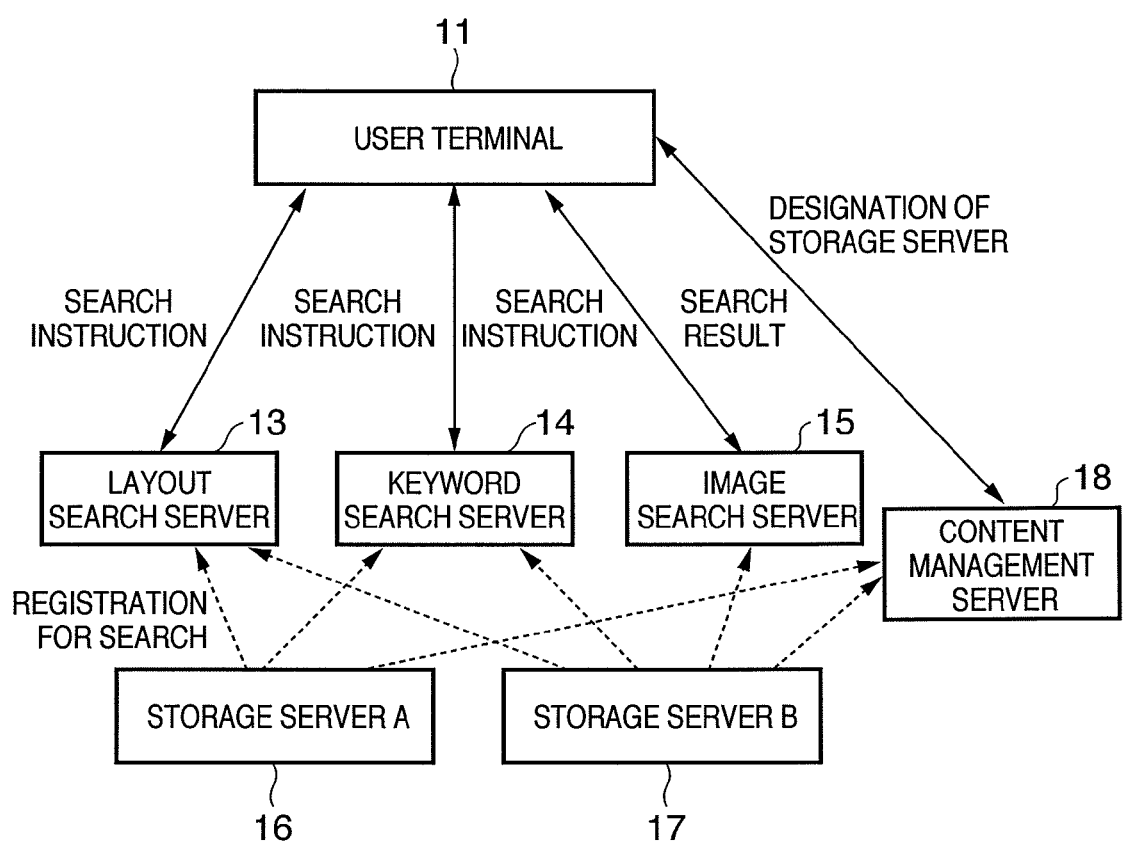
FIG. 7 is a block diagram showing the configuration of a search system according to the third embodiment of the present invention.

FIG. 7 is a block diagram showing the configuration of the search system according to the third embodiment of the present invention.

In FIG. 7, the same reference numerals as in FIG. 1 denote the same parts, and a detailed description thereof will be omitted.

In FIG. 7, a content management server 18 is constructed instead of the metadata search server 12 shown in FIG. 1.

In the first and second embodiments, the user terminal 11 transmits a search instruction to the metadata search server 12, and receives a search result to the search instruction from the metadata search server 12. That is, in the first and second embodiments, a series of processes when search is executed in accordance with a search instruction from the user terminal 11 are centralized by the metadata search server 12.

In the third embodiment, when search is performed, a user terminal 11 transmits, to the content management server 18, storage server information for designating a storage server which stores a multimedia content to be searched for. Based on the received storage server information, the content management server 18 chooses a search server suitable for the storage server represented by the storage server information. The content management server 18 transmits the chosen server information to the user terminal 11. The user terminal 11 transmits a search instruction to the search server represented by the received server information, and receives a search result to the search instruction.

The configuration of the third embodiment is preferable particularly when the user knows a storage server which stores a multimedia content to be searched for or wants to search a predetermined storage server for a multimedia content.

A metadata registration process according to the third embodiment may be implemented in the user terminal 11 or individually in each search server, in place of the metadata search server 12 according to the first embodiment. In any case, the registration method is arbitrary as far as metadata of a multimedia content can be finally registered in the search server.

When each search server registers metadata, it transmits, to the content management server 18, identification information representing a corresponding multimedia content, information representing a storage server which stores the multimedia content, and information on the search server.

The content management server 18 stores various types of information received from each search server as server information as shown in FIG. 8 in a server information management table in an external storage device 206 of the content management server 18. In particular, the server information management table shown in FIG. 8 is information which manages the correspondence between a search server, a storage server, and a multimedia content of the storage server that is registered for search in the search server.

More specifically, server information stored in the server information management table manages the correspondence between each search server name, a content ID for specifying a multimedia content which can be searched for by each search server, and the name of a storage server which stores the multimedia content.

A search process when a multimedia content is searched for on the basis of a search instruction from the user terminal 11 will be explained with reference to FIG. 9.

Figure 9:
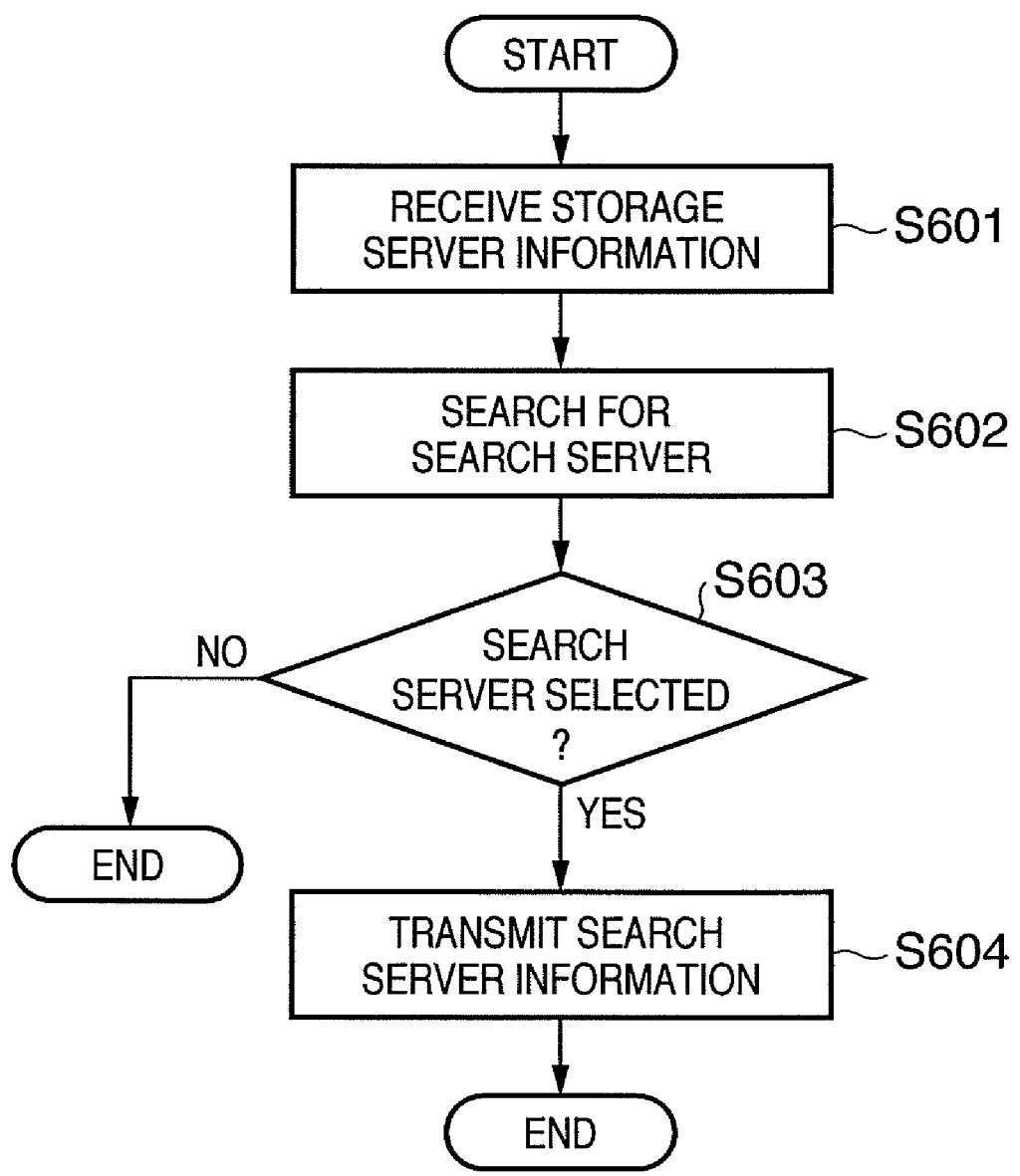
FIG. 9 is a flowchart showing a search process according to the third embodiment of the present invention.

In FIG. 9, only processes executed by the content management server 18 among a series of search processes executed in the third embodiment will be explained.

FIG. 9 is a flowchart showing a search process according to the third embodiment of the present invention.

In step S601, the content management server 18 receives, from the user terminal 11, storage server information on a storage server which stores a multimedia content to be searched for. In step S602, the content management server 18 refers to the server information management table shown in FIG. 8, and searches for and selects a search server optimal for the storage server represented by the received storage server information.

In step S603, the content management server 18 determines the presence/absence of the selected search server. If no selected search server exists (NO in step S603), the process ends. If the selected search server exists (YES in step S603), the process advances to step S604.

In step S604, the content management server 18 transmits, to the user terminal 11, server information representing the selected search server.

The user terminal 11 can receive the server information representing the search server capable of executing optimal search in the storage server represented by the storage server information transmitted to the content management server 18.

The user terminal 11 instructs the search server represented by the received server information to perform search, and can utilize the search server to appropriately search for a multimedia content stored in the storage server intended by the user.

In the third embodiment, for example, the content management server 18 transmits, to the user terminal 11, server information representing a search server capable of executing optimal search in a storage server represented by storage server information received from the user terminal 11. In addition to the server information, the content management server 18 may transmit identification information of a multimedia content serving as a search candidate. Even in this case, the present invention functions effectively.

As described above, according to the third embodiment, the content management server 18 searches, on the basis of storage server information received from the user terminal 11, for a search server capable of executing optimal search in a storage server represented by the storage server information. The content management server 18 transmits server information representing the detected search server to the user terminal 11.

The user of the user terminal can search for a search server optimal for searching for a multimedia content stored in a target storage server.

Fourth Embodiment

In the first to third embodiments, the metadata search server 12 or content management server 18 for supporting choice of search by a proper search server in accordance with a search instruction from the user terminal 11 is constructed. However, each search server may provide an alternate function corresponding to the function of the metadata search server 12 or content management server 18.

In the fourth embodiment, a user terminal 11 transmits a search instruction to a predetermined one of a plurality of types of search servers. Based on the search instruction, the receiving search server performs search mainly by the search server, choice of a proper search server from the remaining search servers, or cooperative search between the search server and another search server.

The configuration of a search system according to the fourth embodiment will be described with reference to FIG. 10.

Figure 10:
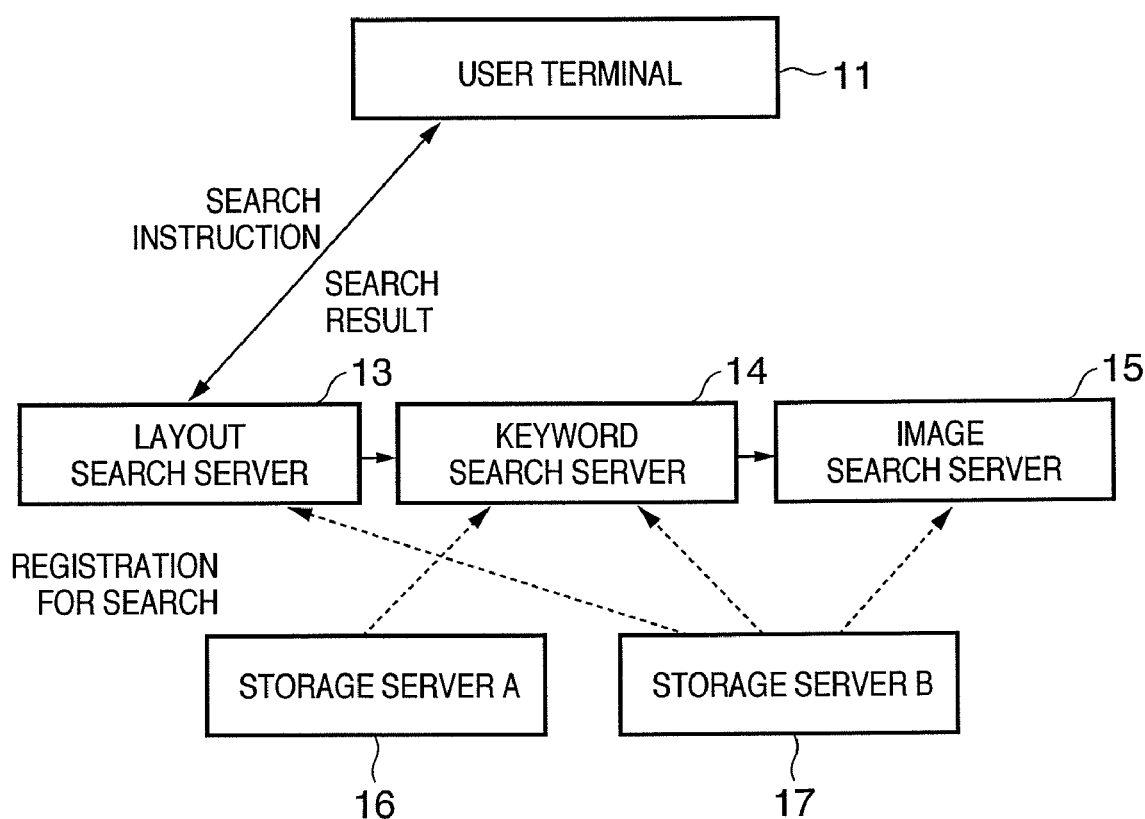
FIG. 10 is a block diagram showing the configuration of a search system according to the fourth embodiment of the present invention.

FIG. 10 is a block diagram showing the configuration of the search system according to the fourth embodiment of the present invention.

In FIG. 10, the same reference numerals as in FIG. 1 denote the same parts, and a detailed description thereof will be omitted.

As shown in FIG. 10, the search system in the fourth embodiment does not comprise either the metadata search server 12 in the first embodiment or the content management server 18 in the third embodiment.

In the fourth embodiment, the user terminal 11 transmits a search instruction to a layout search server 13. Upon reception of the search instruction, the layout search server 13 chooses a proper one of search servers including the layout search server 13 itself on the basis of the search instruction, or executes cooperative search between the layout search server 13 and the remaining search servers.

A metadata registration process according to the fourth embodiment may be implemented in the user terminal 11 or individually in each search server, in place of the metadata search server 12 according to the first embodiment. In any case, the registration method is arbitrary as far as metadata of a multimedia content can be finally registered in the search server.

Each search server registers, e.g., server information shown in FIG. 5 that is obtained by the metadata registration process, as a server information management table in an external storage device 206 of the search server.

Alternatively, search servers may exchange their own server information management tables with each other, and each search server may store, in its external storage device 206, its server information management table and the server information management tables of the remaining search servers. That is, server information management tables may be exchanged between search servers to synchronize the contents of the tables.

A search process when a multimedia content is searched for on the basis of a search instruction from the user terminal 11 will be explained.

In the search process of the fourth embodiment, the process in FIG. 6 which is executed by the metadata search server 12 in the first embodiment is executed by the layout search server 13 in the configuration of FIG. 10.

Referring to FIG. 6, the layout search server 13 receives a search instruction (query of search) from the user terminal 11, and searches for a multimedia content corresponding to the search instruction. In step S502, the layout search server 13 inquires server information management tables of respective search servers, collects the server information management tables stored in the search servers, and selects a proper one of the search servers including the layout search server 13 under the query.

When the layout search server 13 stores server information management tables stored in the remaining search serves in the external storage device 206 of the layout search server 13, the layout search server 13 need not collect these server information management tables.

If the selected search server exists (YES in step S503), the layout search server 13 requests the chosen search server to perform search in step S504. At this time, when the requesting search server is also chosen, search by the search server is also executed.

Every time a search result is obtained in step S505, the layout search server 13 cumulatively holds search results in step S506. When the layout search server 13 obtains search results from selected servers, it integrates the held search results, and outputs the final search result to the user terminal 11.

As described above, according to the fourth embodiment, a search server which has received a query from the user terminal 11 selects a search server suitable for search under the query from search servers including the receiving search server itself. The search server collects search results from the selected search server, and outputs them to the user terminal 11.

The user of the user terminal 11 can more efficiently search for a desired multimedia content at high convenience without any consciousness of the type of search server which forms the search system, or the contents and type of a multimedia content stored in the storage server.

Fifth Embodiment

The fifth embodiment is an application of the third embodiment, and a storage server provides an alternate function corresponding to the function of the content management server 18 in the third embodiment. In addition to this, in search, a user terminal 11 receives server information which is provided from the storage server and represents a search server proper for search. A configuration of transmitting a search instruction to the search server represented by the received server information, and receiving a search result to the search instruction will be described.

The configuration of the search system according to the fifth embodiment will be explained with reference to FIG. 11.

Figure 11:
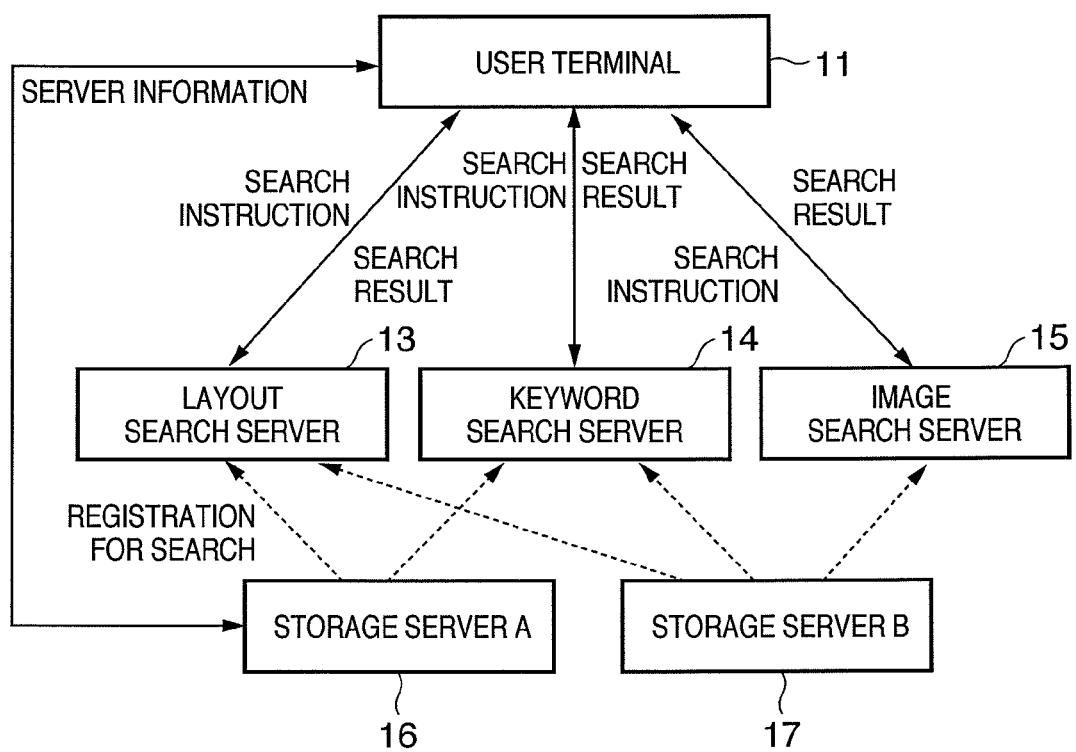
FIG. 11 is a block diagram showing the configuration of a search system according to the fifth embodiment of the present invention.

FIG. 11 is a block diagram showing the configuration of the search system according to the fifth embodiment of the present invention.

In FIG. 11, the same reference numerals as in FIG. 1 denote the same parts, and a detailed description thereof will be omitted.

As shown in FIG. 11, the search system in the fifth embodiment does not comprise either the metadata search server 12 in the first embodiment or the content management server 18 in the third embodiment.

In the fifth embodiment, in search, the user terminal 11 transmits a search request instruction to a storage server 16 which stores a multimedia content to be searched for. The storage server 16 chooses a search server suitable for the storage server 16 on the basis of the received search request instruction, and transmits the chosen server information to the user terminal 11. The user terminal 11 transmits a search instruction to the search server represented by the received server information, and receives a search result to the search instruction.

A metadata registration process according to the fifth embodiment may be implemented in the user terminal 11 or individually in each search server, in place of the metadata search server 12 according to the first embodiment. In any case, the registration method is arbitrary as far as metadata of a multimedia content can be finally registered in the search server.

When each search server registers metadata, it transmits, to the storage server serving as the registration destination of the metadata, identification information representing a corresponding multimedia content, information representing the storage server which stores the multimedia content, and information on the search server.

The storage server stores various types of information received from each search server as server information as shown in FIG. 8 in a server information management table in an external storage device 206 of the storage server. The server information management table shown in FIG. 8 is information which manages the correspondence between a search server, a storage server, and a multimedia content of the storage server that is registered for search in the search server.

In the fifth embodiment, each storage server suffices to store information which is registered for search of the storage server itself and represents the search server, and identification information representing a multimedia content stored in the storage server. If necessary, storage servers may exchange and store server information management tables. Note that the server information management table shown in FIG. 8 is an example when server information management tables are exchanged between storage servers.

A search process when a multimedia content is searched for on the basis of a search instruction from the user terminal 11 will be explained.

In the search process of the fifth embodiment, the process in FIG. 9 which is executed by the content management server 18 in the third embodiment is executed by the storage server 16 in the configuration of FIG. 11.

Referring to FIG. 9, the storage server 16 receives a search request instruction from the user terminal 11. In step S602, the storage server 16 refers to the server information management table shown in FIG. 8, and searches for and selects a search server optimal for the storage server 16.

If the selected search server exists (YES in step S603), the storage server 16 transmits, to the user terminal 11, server information representing the selected search server in step S604.

The user terminal 11 can receive the server information representing the search server capable of executing optimal search in the storage server which stores a multimedia content to be searched for.

The user terminal 11 instructs the search server represented by the received server information to perform search, and can utilize the search server to appropriately search for a multimedia content stored in the storage server intended by the user.

As described above, according to the fifth embodiment, the storage server searches, on the basis of a search request instruction received from the user terminal 11, for a search server capable of executing optimal search in the storage server. The storage server transmits server information representing the detected search server to the user terminal 11.

The user of the user terminal can search for a search server optimal for searching for a multimedia content stored in a target storage server.

The configurations described in the first to fifth embodiments are merely examples, and an arbitrary combination of the configurations in the first to fifth embodiments can be implemented in accordance with the application purpose. Server information management tables stored in respective servers may be centralized by one server in accordance with the application purpose, or a common server information management table may be managed between servers.

The first and second embodiments have exemplified one metadata search server 12. If necessary, a plurality of metadata search servers 12 may be arranged and cooperate with each other to execute processes in the first and second embodiments. This also applies to the content management server 18 in the third embodiment.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-354703 filed on Dec. 7, 2004, which is hereby incorporated by reference herein.

What is claimed is:

1. A search system configured to search for multimedia contents on the basis of a search instruction input from a user terminal, the system comprising:
    a plurality of storage servers configured to store the multimedia contents having one or more attribute information including at least one of a text attribute, an image attribute and a layout attribute;
    a keyword search server configured to store a first management table and perform a text search based on the text attribute registered in the first management table;
    an image search server configured to store a second management table and perform an image search based on the image attribute registered in the second management table;
    a layout search server configured to store a third management table and perform a layout search based on the layout attribute registered in the third management table;
    a communication network to which the user terminal and said plurality of storage servers, said keyword search server, said image search server and said layout search server connect;
    a metadata search server configured to extract attribute information from a multimedia content to be registered to the system, and register the attribute information to one of the first management table stored in the keyword search server, the second management table stored in the image search server, and the third management table stored in the layout search server to search the attribute information extracted by the metadata search server;
    reception means for receiving the search instruction from the user terminal, wherein the search instruction includes one or more attribute information;
    requesting means for requesting the keyword search server, the image search server and the layout search server to search for each of the attribute information included in the search instruction;
    integration means for collecting and integrating search results based on the search instruction, from the keyword search server and the image search server requested by the requesting means; and
    transmission means for transmitting the search results integrated by said integration means to the user terminal.

2. A metadata search server connected via a communication network, the communication network connecting to a user terminal, a plurality of storage servers, a keyword search server, an image search server and a layout search server, wherein the plurality of storage servers store multimedia contents having one or more attribute information including at least one of a text attribute, an image attribute and a layout attribute, the metadata search server comprising:

a processor; and a computer-readable storage medium storing a computer-executable program, the computer-executable program comprising:

program code to extract attribute information from a multimedia content to be registered, and to register the attribute information to one of a first management table stored in the keyword search server, a second management table stored in the image search server, and a third management table stored in the layout search server to search the attribute information extracted by the metadata search server;

program code to receive a search instruction from the user terminal, wherein the search instruction includes one or more attribute information;

program code to request the keyword search server, the image search server and the layout search server to search for each of the attribute information included in the search instruction;

program code to collect and integrate search results based on the search instruction, from the keyword search server and the image search server requested by the requesting means; and code to transmit the search results integrated by said integration means to the user terminal, wherein the keyword search server performs a text search based on the text attribute registered in the first management table stored in the keyword search server, wherein the image search server performs an image search based on the image attribute registered in the second management table stored in the image search server, and wherein the layout search server performs layout search based on the layout attribute registered in the third management table stored in the layout search server.

3. A method of controlling a metadata search server connected via a communication network, the communication network connecting to a user terminal, a plurality of storage servers, a keyword search server, an image search server and a layout search server, wherein the plurality of storage servers store multimedia contents having one or more attribute information including at least one of a text attribute, an image attribute and a layout attribute, the method comprising:

an extracting step of extracting attribute information from a multimedia content to be registered, and of registering the attribute information to one of a first management table stored in the keyword search server, a second management table stored in the image search server, and a third management table stored in the layout search server to search the attribute information extracted by the metadata search server;

a reception step of receiving a search instruction from the user terminal, wherein the search instruction includes one or more attribute information;

a requesting step of requesting the keyword search server, the image search server and the layout search server to search for each of the attribute information included in the search instruction;

an integration step of collecting and integrating search results from the keyword search server and the image search server requested in the requesting step; and a transmission step of transmitting the search results integrated in the integration step to the user terminal, wherein the keyword search server performs a text search based on the text attribute registered in the first management table stored in the keyword search server, wherein the image search server performs an image search based on the image attribute registered in the second management table stored in the image search server, and wherein the layout search server performs layout search based on the layout attribute registered in the third management table stored in the layout search server.

4. A computer-executable program stored on a computer-readable storage medium, said computer-executable program for implementing control of a metadata search server connected via a communication network, the communication network connecting to a user terminal, a plurality of storage servers, a keyword search server, an image search server and a layout search server, wherein the plurality of storage servers store multimedia contents having one or more attribute information including at least one of a text attribute, an image attribute and a layout attribute, the computer-executable program comprising:

a program code for extracting attribute information from a multimedia content to be registered, and for registering the attribute information to one of a first management table stored in the keyword search server, a second management table stored in the image search server, and a third management table stored in the layout search server to search the attribute information extracted by the metadata search server;

a program code for a reception step of receiving a search instruction from the user terminal, wherein the search instruction includes one or more attribute information, a program code for a requesting step of requesting the keyword search server, the image search server and the layout search server to search for each of the attribute information included in the search instruction;

a program code for an integration step of collecting and integrating search results from the keyword search server and the image search server requested in the requesting step; and a program code for a transmission step of transmitting the search results integrated in the integration step to the user terminal, wherein the keyword search server performs a text search based on the text attribute registered in the first management table stored in the keyword search server, wherein the image search server performs an image search based on the image attribute registered in the second management table stored in the image search server, and wherein the layout search server performs layout search based on the layout attribute registered in the third management table stored in the layout search server.

5. The system according to claim 1, wherein said metadata search server further comprises:

device information reception means for receiving, from the user terminal, storage server information representing a storage server configured to store a multimedia content to be searched for, search means for searching, on the basis of the storage server information received by said device information reception means, the keyword search server and the image search server for a device caused to search said storage server represented by the storage server information, and device information transmission means for transmitting, to the user terminal, search server information representing said search server searched for by said search means.

6. The system according to claim 5, wherein
said metadata search server further comprises device information storage means for storing the management table configured to manage the search server information representing the search servers to search for multimedia contents stored in said respective storage servers, and
wherein said search means refers to the management table on the basis of the storage server information received by said device information reception means, and searches the keyword search server and the image search server for a device caused to search said storage server represented by the storage server information.

* * * * *